(12) United States Patent
Chu et al.

(10) Patent No.: US 10,115,009 B2
(45) Date of Patent: Oct. 30, 2018

(54) BODY RELATIONSHIP ESTIMATION METHOD AND APPARATUS (71) Applicant: Huawei Technologies Co., Ltd., Shenzhen (CN)

(72) Inventors: Xiao Chu, Hong Kong (HK); Wanli Ouyang, Hong Kong (HK); Xiaogang Wang, Hong Kong (HK); Wei Li, Shenzhen (CN); Jianzhuang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 15/289,450

(22) Filed: Oct. 10, 2016

(65) Prior Publication Data
US 2017/0154213 A1 Jun. 1, 2017

(30) Foreign Application Priority Data
Nov. 26, 2015 (CN) .......................... 2015 1 0845504

(51) Int. Cl.
G06K 9/00 (2006.01)
G06K 9/62 (2006.01)
(Continued)

(52) U.S. Cl.
CPC ..... *G06K 9/00375* (2013.01); *G06K 9/00335* (2013.01); *G06K 9/6202* (2013.01);
(Continued)

(58) Field of Classification Search
CPC ........... G06K 9/00369; G06K 9/00362; G06K 9/00228; G06K 9/3241; G06K 9/4642;
(Continued)

(56) References Cited

U.S. PATENT DOCUMENTS 7,940,960 B2 * 5/2011 Okada ................ G06K 9/00369
382/103
8,315,965 B2 * 11/2012 Shet ....................... G06K 9/626
706/47

(Continued)

OTHER PUBLICATIONS

Yang, Y., et al., "Articulated Human Detection with Flexible Mixtures-of-Parts," IEEE Conference on Computer Vision and Pattern Recognition, 2011, 15 pages.
(Continued)

*Primary Examiner* — Michael Osinski
(74) *Attorney, Agent, or Firm* — Conley Rose, P.C.

(57) ABSTRACT

A body relationship estimation method and apparatus are disclosed. The method includes obtaining a target picture, calculating a first body relationship feature of two persons according to at least one of first location information of a body part of each person of the two persons in the target picture or second location information of body parts of the two persons, where the first location information is obtained by performing single-person gesture estimation on each person, and the second location information is obtained by performing two-person joint gesture estimation on the two persons when the first location information indicates that the body parts of the two persons overlap, and determining a body relationship between the two persons according to the first body relationship feature.

11 Claims, 3 Drawing Sheets (51) Int. Cl.
*G06K 9/66* (2006.01)
*G06K 9/46* (2006.01)

(52) U.S. Cl.
CPC ............. *G06K 9/6215* (2013.01); *G06K 9/66* (2013.01); *G06K 9/4628* (2013.01)

(58) Field of Classification Search
CPC .... G06K 9/66; G06K 9/6215; G06K 9/00375; G06K 9/6202; G06K 9/3233; G06K 9/4647; G06K 9/6212; G06T 2207/30196; G06T 2207/20076; G06T 2207/20081; G06T 2207/20021; G06T 2207/30242; H04N 5/23219
See application file for complete search history.

(56) References Cited

U.S. PATENT DOCUMENTS

| | | | | |
|---|---|---|---|---|
| 8,873,859 | B2* | 10/2014 | Yashiro | G06K 9/00362 |
| | | | | 382/181 |
| 9,147,105 | B2* | 9/2015 | Sagawa | G06K 9/00221 |
| 9,436,871 | B2* | 9/2016 | Liu | G06K 9/00382 |
| 9,489,570 | B2* | 11/2016 | Cao | G06K 9/00342 |
| 9,552,643 | B2* | 1/2017 | Jung | G06T 7/73 |
| 9,569,694 | B2* | 2/2017 | Othmezouri | G06K 9/00369 |
| 9,600,711 | B2* | 3/2017 | Shreve | G06K 9/00228 |
| 9,684,821 | B2* | 6/2017 | Zhou | G06F 3/017 |
| 9,792,689 | B2* | 10/2017 | Shiozaki | G06T 7/73 |
| 9,852,340 | B2* | 12/2017 | Mai | G06K 9/00624 |
| 2008/0152218 | A1* | 6/2008 | Okada | G06K 9/00369 |
| | | | | 382/159 |
| 2010/0008540 | A1* | 1/2010 | Shet | G06K 9/00369 |
| | | | | 382/103 |
| 2011/0052076 | A1* | 3/2011 | Yashiro | G06K 9/00362 |
| | | | | 382/190 |
| 2013/0064425 | A1* | 3/2013 | Sagawa | G06K 9/00221 |
| | | | | 382/103 |
| 2013/0070105 | A1* | 3/2013 | Ike | G06K 9/00355 |
| | | | | 348/169 |
| 2013/0271458 | A1 | 10/2013 | Andriluka et al. | |
| 2014/0056518 | A1* | 2/2014 | Yano | G06K 9/6267 |
| | | | | 382/173 |
| 2014/0063236 | A1* | 3/2014 | Shreve | G06K 9/00228 |
| | | | | 348/143 |
| 2014/0114643 | A1 | 4/2014 | Baker et al. | |
| 2014/0270363 | A1 | 9/2014 | Chakraborty et al. | |
| 2014/0270482 | A1 | 9/2014 | Chakraborty et al. | |
| 2014/0347475 | A1 | 11/2014 | Divakaran et al. | |
| 2015/0036879 | A1* | 2/2015 | Shiozaki | G06T 7/0046 |
| | | | | 382/103 |
| 2015/0055822 | A1* | 2/2015 | Zhou | G06F 3/017 |
| | | | | 382/103 |
| 2015/0186713 | A1* | 7/2015 | Cao | G06K 9/00342 |
| | | | | 382/103 |
| 2015/0363933 | A1* | 12/2015 | Jung | G06T 7/73 |
| | | | | 382/103 |
| 2016/0092736 | A1* | 3/2016 | Mai | G06K 9/00624 |
| | | | | 382/103 |
| 2016/0117571 | A1* | 4/2016 | Othmezouri | G06K 9/00369 |
| | | | | 382/165 |
| 2016/0140399 | A1* | 5/2016 | Yano | G06K 9/00778 |
| | | | | 382/103 |
| 2017/0039417 | A1* | 2/2017 | Saruta | G06K 9/00228 |
| 2018/0018524 | A1* | 1/2018 | Yao | G06K 9/00771 |
| 2018/0068461 | A1* | 3/2018 | Shiozaki | G06T 7/75 |

OTHER PUBLICATIONS

Yang, Y., et al., "Recognizing Proxemics in Personal Photos," XPIEEE Conference on Computer Vision and Pattern Recognition, Jun. 16-21, 2012, pp. 3522-3529.

Yang, Y., et al., "Articulated pose estimation with flexible mixtures-of-parts," IEEE Conference on Computer Vision and Pattern Recognition (CVPR), 2011, pp. 1385-1392.

Patron-Perez, A., et al., "Structured Learning of Human Interactions in TV Shows," IEEE Transactions on Pattern Analysis and Machine Intelligence, vol. 34, No. 12, Dec. 2012, pp. 2441-2453.

Eichner, M., et al., "We Are Family: Joint Pose Estimation of Multiple Persons," XP19150510, European Conference on Computer Vision, Sep. 5, 2010, pp. 228-242.

Park, S., et al., "Recognition of Two-person Interactions Using a Hierarchical Bayesian Network," XP55359596, International Multimedia Conferece—Firest ACM SIGMM International Workshop Unuideo Surveillance, Nov. 7, 2003, 12 pages.

Foreign Communication From a Counterpart Application, European Application No. 16192144.0, Extended European Search Report dated Apr. 7, 2017, 9 pages.

Kong, Y., et al., "Recognising human interaction from videos by a discriminative model," XP6048824A, The Institution of Engineering and Technology, vol. 8, No. 4, 2014, pp. 277-286.

Park, S., et al., "Semantic-level Understanding of Human Actions and Interactions using Event Hierarchy," XP010761955, Jun. 6-27, 2004, 9 pages.

Ryoo, M.S., et al., "Recognition of Composite Human Activities through Context-Free Grammar based Representation," XP10922989A, Proceedings of the 2006 IEEE Computer Society Conference an Computer Vision and Pattern Recognitian (CVPR"06), 2006, 8 pages.

Huynh-The, T., et al., "PAM-Based Flexible Generative Topic Model for 3D Interactive Activity Recognition," XP32854404A, International Conference on Advanced Technologies for Communications (ATC), 2015, pp. 117-122.

Foreign Communication From a Counterpart Application, European Application No. 16192144.0, European Office Action dated May 3, 2018, 6 pages.

* cited by examiner

BODY RELATIONSHIP ESTIMATION METHOD AND APPARATUS

CROSS-REFERENCE TO RELATED APPLICATION

This application claims priority to Chinese Patent Application No. 201510845504.8, filed on Nov. 26, 2015, which is hereby incorporated by reference in its entirety.

TECHNICAL FIELD

The present application relates to the field of computer technologies, and in particular, to a body relationship estimation method and apparatus.

BACKGROUND

An interpersonal relationship is a kind of resources. The interpersonal relationship may be used for further inferring a living circle, a consumption level, a social status, and even a personal preference of a person, so as to further make a targeted recommendation, retention of a valued customer, or the like, which is undoubtedly important to a merchant. The interpersonal relationship is obtained in many manners. Currently, the interpersonal relationship is generally interred by analyzing a large amount of data. Photos provide most vivid visual information. As photographing becomes an important function of a mobile phone, a quantity of photos increases explosively. People are willing to share group photos of them and friends or relatives to a network medium such as Facebook®. These resources provide feasibility for estimating an interpersonal relationship by using photos.

A body location relationship between people usually reflects an intimacy degree between people, and an interpersonal relationship may be further inferred. For automatically determining a body relationship between two persons in a photo by a computer, in the prior art, person detection is first performed on the picture and then single-person gesture estimation is performed on each detected person. Afterwards, two-person joint gesture estimation is performed on two persons whose gesture estimation results overlap so as to obtain a body relationship between the persons.

Accuracy of the single-person gesture estimation or the two-person joint gesture estimation is not high because the single-person gesture estimation or the two-person joint gesture estimation is easily affected by a factor such as blocking. Therefore, due to a lack of an effective analysis on a result of the single-person gesture estimation or the two-person gesture estimation, accuracy of a body relationship directly estimated according to the result of the single-person gesture estimation or the two-person joint gesture estimation is not high.

SUMMARY

Embodiments of the present application disclose a body relationship estimation method and apparatus so as to improve accuracy of body relationship estimation.

According to a first aspect, an embodiment of the present application discloses a body relationship estimation method, where the method includes obtaining a target picture, where the target picture may be a locally stored picture, or may be a picture obtained by using a network, calculating a first body relationship feature of two persons according to at least one of first location information of a body part of each person of the two persons in the target picture or second location information of body parts of the two persons, where the first location information may be obtained by performing single-person gesture estimation on each person, the second location information may be obtained by performing two-person joint gesture estimation on the two persons when the first location information indicates that the body parts of the two persons overlap, and the first location information and the second location information are absolute location information, and determining a body relationship between the two persons according to the first body relationship feature.

In an embodiment, the first body relationship feature may include at least one of a matching degree between the body part indicated by the first location information and the body parts indicated by the second location information, an overlap proportion between the two persons, or a relative distance from each body part of each person of the two persons to a central location of the two persons.

In an embodiment, the first location information may include a first area used to indicate a location of the body part of each person, and the overlap proportion between the two persons may include an overlap proportion between the $i^{th}$ body parts of the two persons, where i is an integer greater than or equal to 1, and when the first body relationship feature includes the overlap proportion between the two persons, calculating the overlap proportion between the two persons according to at least one of the first location information of the body part of each person of the two persons in the target picture or the second location information of the body parts of the two persons may include calculating the overlap proportion between the $i^{th}$ body parts of the two persons by using the following formula:

$$\Psi_{ov} = \frac{\bigcap (box_i^1, box_i^2)}{\bigcup (box_i^1, box_i^2)}$$

where $\Psi_{ov}$ represents the overlap proportion between the $i^{th}$ body parts of the two persons, $box_i^1$ represents a first area of a location of the $i^{th}$ body part of the first person of the two persons, and $box_i^2$ represents a first area of a location of the $i^{th}$ body part of the second person of the two persons.

In an embodiment, the relative distance from each body part of each person of the two persons to the central location of the two persons includes a relative distance from the $j^{th}$ body part of each person of the two persons to the central location of the two persons, and the first location information may include coordinates of the body part of each person in the target picture, where j is an integer greater than or equal to 1, and when the first body relationship feature includes the relative distance from each body part of each person of the two persons to the central location of the two persons, calculating the relative distance from each body part of each person of the two persons to the central location of the two persons according to at least one of the first location information of the body part of each person of the two persons in the target picture or the second location information of the body parts of the two persons includes calculating the relative distance from the $j^{th}$ body part of each person of the two persons to the central location of the two persons by using the following formula:

$$\Psi_L = \left\{ [x_j^k, y_j^k] - \frac{1}{2n} \sum_{k=1}^{2} \sum_{j=1}^{n} [x_j^k, y_j^k] \right\} / n_{scale}$$

where $\Psi_L$ represents the relative distance from the $j^{th}$ body part of each person of the two persons to the central location of the two persons, $[x_j^k, y_j^k]$ represents coordinates of the $j^{th}$ body part of the $k^{th}$ person of the two persons in the target picture, n represents a total quantity of body parts included in each person, $n_{scale}$ is a sum of distances from the central location to all body parts of the two persons, $$\frac{1}{2n}\sum_{k=1}^{2}\sum_{j=1}^{n}[x_j^k, y_j^k]$$

represents coordinates of the central location, n is an integer greater than 1, and k is 1 or 2.

In an embodiment, the first location information may include the first area used to indicate the location of the body part of each person, the second location information may include a second area used to indicate the location of the body part of each person, and the matching degree between the body part indicated by the first location information and the body parts indicated by the second location information includes a matching degree between a first area used to indicate a location of the $t^{th}$ body part of each person and a second area used to indicate the location of the $t^{th}$ body part of each person, where t is an integer greater than or equal to 1, and when the first body relationship feature includes the matching degree between the body part indicated by the first location information and the body parts indicated by the second location information, calculating, according to at least one of the first location information of the body part of each person of the two persons in the target picture or the second location information of the body parts of the two persons, the matching degree between the body part indicated by the first location information and the body parts indicated by the second location information includes calculating, by using the following formula, the matching degree between the first area used to indicate the location of the $t^{th}$ body part of each person and the second area used to indicate the location of the $t^{th}$ body part of each person:

$$\Psi_m = \frac{\bigcap(A_t^1, A_t^2)}{\bigcup(A_t^1, A_t^2)}$$

where $\Psi_m$ represents the matching degree between the first area used to indicate the location of the $t^{th}$ body part of each person and the second area used to indicate the location of the $t^{th}$ body part of each person, $A_t^1$ represents the first area used to indicate the location of the $t^{th}$ body part of each person, $A_t^2$ represents the second area used to indicate the location of the $t^{th}$ body part of each person, and the first (or second) area may be a square area that includes a body part.

In an embodiment, the body relationship may include at least one of a body interaction relationship between the two persons, a relative distance between the two persons, a relative inclined body direction of the two persons, or a relative body orientation of the two persons, where the body interaction relationship may include at least one of arm in arm, a handshake, a hug, a back hug, a high five, hand on shoulder, or shoulder to shoulder, the relative distance may be close, middle, or far, the inclined body direction may be left inclined, right inclined, or erect, and the body orientation may be forward, backward, leftward, or rightward.

In an embodiment, the method may further include obtaining a second body relationship feature of the two persons, where the second body relationship feature may include at least one of a first confidence value of the first location information, first direction information of the body part of each person, a second confidence value of the second location information, or second direction information of the body part of each person, where the first confidence value and the first direction information are obtained by performing single-person gesture estimation on each person, the second confidence value and the second direction information are obtained by performing two-person joint gesture estimation on the two persons when the first location information indicates that the body parts of the two persons overlap, the first confidence value of the first (or second) location information indicates confidence that a body part at a location corresponding to the first (or second) location information is at the location corresponding to the first (or second) location information, and the first (or second) direction information of the body part of each person is information about a direction corresponding to a gesture that may be posed by the body part of each person, and when the second body relationship feature is obtained, the determining a body relationship between the two persons according to the first body relationship feature may include determining the body relationship between the two persons according to the first body relationship feature and the second body relationship feature, where the body relationship between the two persons may be determined according to both the first body relationship feature and the second body relationship feature, which may further improve accuracy of body relationship estimation.

In an embodiment, the determining the body relationship between the two persons according to the first body relationship feature and the second body relationship feature may include using the first body relationship feature and the second body relationship feature as input of the $(N+1)^{th}$ layer of a neural network model, and using output of the $(N+1)^{th}$ layer of the neural network model as the body relationship between the two persons, wherein the $(N+1)^{th}$ layer comprises M times of recursion, the output of the $(N+1)^{th}$ layer comprises output of the $M^{th}$ recursion, N is an integer greater than or equal to 1, and M is an integer greater than 1.

In an embodiment, output of the first N layers of the neural network model may be represented as the following formula:

$$\begin{cases} h_{g+1,1} = f(W_{g+1}h_{g,1} + b_{g+1}), g = 1, \ldots, N-1 \\ h_{1,1} = f(W_1\alpha + b_1) \end{cases}$$

where $h_{g+1,1}$ represents output of the $(g+1)^{th}$ layer of the neural network model, $W_1$, $b_1$, $W_{g+1}$, $b_{g+1}$ and represent parameters of the neural network model, f(•) represents a nonlinear activation function, and α represents the first body relationship feature and the second body relationship feature, and M times of recursion may be represented as the following formula:

$$\begin{cases} h_{N+1,q+1} = f(W_{N+1}h_{N,1} + W_b | P_q + b_{N+1}) \\ p_q = f(W_{cls}h_{N+1,q} + b_{cls}), q = 1, 2, \ldots, M \end{cases}$$

where $P_q$ represents the output of the $q^{th}$ recursion of the $(N+1)^{th}$ layer of the neural network model, and when q is M, $P_q$ represents the body relationship between the two persons, $h_{N+1,q+1}$ represents an intermediate variable of the $(q+1)^{th}$ recursion of the $(N+1)^{th}$ layer of the neural network model, and $W_{N+1}$, $W_b$, $b_{N+1}$, $W_{cls}$, and $b_{cls}$ represent parameters of the neural network model, where all parameters in the neural network model may be obtained by means of training, and N and M are respectively iteration times and recursion times by using which an output result error can be less than a preset value in a training process.

According to a second aspect, an embodiment of the present application discloses a method for generating a neural network model for body relationship estimation, where the method includes obtaining at least one training picture, calculating a first body relationship feature of two persons according to at least one of first location information of a body part of each person of the two persons in each picture of the at least one training picture or second location information of body parts of the two persons, where the first location information is obtained by performing single-person gesture estimation on each person, and the second location information is obtained by performing two-person joint gesture estimation on the two persons when the first location information indicates that the body parts of the two persons overlap, and determining the neural network model according to the first body relationship feature and a preset body relationship between the two persons.

In an embodiment, the method may further include obtaining a second body relationship feature of the two persons, where the second body relationship feature may include at least one of a first confidence value of the first location information, first direction information of the body part of each person, a second confidence value of the second location information, or second direction information of the body part of each person, where the first confidence value and the first direction information are obtained by performing single-person gesture estimation on each person, the second confidence value and the second direction information are obtained by performing two-person joint gesture estimation on the two persons when the first location information indicates that the body parts of the two persons overlap, the first confidence value of the first (or second) location information indicates confidence that a body part at a location corresponding to the first (or second) location information is at the location corresponding to the first (or second) location information, and the first (or second) direction information of the body part of each person is information about a direction corresponding to a gesture that may be posed by the body part of each person, and the determining the neural network model according to the first body relationship feature and a preset body relationship between the two persons may include determining the neural network model according to the first body relationship feature, the second body relationship feature, and the preset body relationship between the two persons, where the neural network model of the two persons may be determined according to both the first body relationship feature and the second body relationship feature, which may further improve accuracy of a neural network model.

According to a third aspect, an embodiment of the present application discloses a body relationship estimation apparatus, where the apparatus includes a first obtaining unit, configured to obtain a target picture, where the target picture may be a locally stored picture, or may be a picture obtained by using a network, a calculation unit, configured to calculate a first body relationship feature of two persons according to at least one of first location information of a body part of each person of the two persons in the target picture obtained by the first obtaining unit or second location information of body parts of the two persons, where the first location information may be obtained by performing single-person gesture estimation on each person, the second location information may be obtained by performing two-person joint gesture estimation on the two persons when the first location information indicates that the body parts of the two persons overlap, and the first location information and the second location information are absolute location information, and a determining unit, configured to determine a body relationship between the two persons according to the first body relationship feature calculated by the calculation unit.

In an embodiment, the first body relationship feature may include at least one of a matching degree between the body part indicated by the first location information and the body parts indicated by the second location information, an overlap proportion between the two persons, or a relative distance from each body part of each person of the two persons to a central location of the two persons.

In an embodiment, the first location information may include a first area used to indicate a location of the body part of each person, and the overlap proportion between the two persons may include an overlap proportion between the $i^{th}$ body parts of the two persons, where i is an integer greater than or equal to 1, and when the first body relationship feature includes the overlap proportion between the two persons, a manner in which the calculation unit calculates the overlap proportion between the two persons is calculating the overlap proportion between the $i^{th}$ body parts of the two persons by using the following formula:

$$\Psi_{ov} = \frac{\bigcap(box_i^1, box_i^2)}{\bigcup(box_i^1, box_i^2)}$$

where $\Psi_{ov}$ represents the overlap proportion between the $i^{th}$ body parts of the two persons, $box_i^1$ represents a first area of a location of the $i^{th}$ body part of the first person of the two persons, and $box_i^2$ represents a first area of a location of the $i^{th}$ body part of the second person of the two persons.

In an embodiment, the relative distance from each body part of each person of the two persons to the central location of the two persons includes a relative distance from the $j^{th}$ body part of each person of the two persons to the central location of the two persons, and the first location information may include coordinates of the body part of each person in the target picture, where j is an integer greater than or equal to 1, and when the first body relationship feature includes the relative distance from each body part of each person of the two persons to the central location of the two persons, a manner in which the calculation unit calculates the relative distance from each body part of each person of the two persons to the central location of the two persons is calculating the relative distance from the $j^{th}$ body part of each person to the central location of the two persons by using the following formula:

$$\Psi_L = \left\{ [x_j^k, y_j^k] - \frac{1}{2n} \sum_{k=1}^{2} \sum_{j=1}^{n} [x_j^k, y_j^k] \right\} / n_{scale}$$

where $\Psi_L$ represents the relative distance from the $j^{th}$ body part of each person of the two persons to the central location of the two persons, $[x_j^k, y_j^k]$ represents coordinates of the $j^{th}$ body part of the $k^{th}$ person of the two persons in the target picture, n represents a total quantity of body parts included in each person, $n_{scale}$ is a sum of distances from the central location to all body parts of the two persons, $$\frac{1}{2n}\sum_{k=1}^{2}\sum_{j=1}^{n}[x_j^k, y_j^k]$$

represents coordinates of the central location, n is an integer greater than 1, and k is 1 or 2.

In an embodiment, the first location information may include the first area used to indicate the location of the body part of each person, the second location information may include a second area used to indicate the location of the body part of each person, and the matching degree between the body part indicated by the first location information and the body parts indicated by the second location information includes a matching degree between a first area used to indicate a location of the $t^{th}$ body part of each person and a second area used to indicate the location of the $t^{th}$ body part of each person, where t is an integer greater than or equal to 1, and when the first body relationship feature includes the matching degree between the body part indicated by the first location information and the body parts indicated by the second location information, a manner in which the calculation unit calculates the matching degree between the body part indicated by the first location information and the body parts indicated by the second location information is calculating, by using the following formula, the matching degree between the first area used to indicate the location of the $t^{th}$ body part of each person and the second area used to indicate the location of the $t^{th}$ body part of each person:

$$\Psi_m = \frac{\bigcap(A_t^1, A_t^2)}{\bigcup(A_t^1, A_t^2)}$$

where $\Psi_m$ represents the matching degree between the first area used to indicate the location of the $t^{th}$ body part of each person and the second area used to indicate the location of the $t^{th}$ body part of each person, $A_t^1$ represents the first area used to indicate the location of the $t^{th}$ body part of each person, $A_t^2$ represents the second area used to indicate the location of the $t^{th}$ body part of each person, and the first (or second) area may be a square area that includes a body part.

In an embodiment, the body relationship may include at least one of a body interaction relationship between the two persons, a relative distance between the two persons, a relative inclined body direction of the two persons, or a relative body orientation of the two persons, where the body interaction relationship may include at least one of arm in arm, a handshake, a hug, a back hug, a high five, hand on shoulder, or shoulder to shoulder, the relative distance may be close, middle, or far, the inclined body direction may be left inclined, right inclined, or erect, and the body orientation may be forward, backward, leftward, or rightward.

In an embodiment, the apparatus may further include a second obtaining unit, configured to obtain a second body relationship feature of the two persons, where the second body relationship feature includes at least one of a first confidence value of the first location information, first direction information of the body part of each person, a second confidence value of the second location information, or second direction information of the body part of each person, where the first confidence value and the first direction information are obtained by performing single-person gesture estimation on each person, the second confidence value and the second direction information are obtained by performing two-person joint gesture estimation on the two persons when the first location information indicates that the body parts of the two persons overlap, the first confidence value of the first (or second) location information indicates confidence that a body part at a location corresponding to the first (or second) location information is at the location corresponding to the first (or second) location information, and the first (or second) direction information of the body part of each person is information about a direction corresponding to a gesture that may be posed by the body part of each person, and the determining unit is configured to determine the body relationship between the two persons according to the first body relationship feature calculated by the calculation unit and the second body relationship feature obtained by the second obtaining unit.

In an embodiment, a manner in which the determining unit determines the body relationship between the two persons according to the first body relationship feature and the second body relationship feature is using the first body relationship feature and the second body relationship feature as input of the first layer of a neural network model, determining output of the $g^{th}$ layer of the neural network model as input of the $(g+1)^{th}$ layer of the neural network model, and by analogy, obtaining output of the $N^{th}$ layer of the neural network model, where N is an integer greater than or equal to 1, g is an integer that is greater than or equal to 1 and less than or equal to N−1, determining the output of the $N^{th}$ layer of the neural network model as input of the first recursion of the $(N+1)^{th}$ layer of the neural network model, and determining output of the $q^{th}$ recursion of the $(N+1)^{th}$ layer of the neural network model and the output of the $N^{th}$ layer of the neural network model as input of the $(q+1)^{th}$ recursion of the $(N+1)^{th}$ layer of the neural network model, by analogy, obtaining output of the $M^{th}$ recursion of the $(N+1)^{th}$ layer of the neural network model, and determining the output of the $M^{th}$ recursion of the $(N+1)^{th}$ layer of the neural network model as the body relationship between the two persons, where M is an integer greater than 1, q is an integer that is greater than or equal to 1 and less than or equal to M−1, and the neural network model may be a deep neural network algorithm.

In an embodiment, output of the first N layers of the neural network model are represented as the following formula:

$$\begin{cases} h_{g+1,1} = f(W_{g+1}h_{g,1} + b_{g+1}), g = 1, \ldots, N-1 \\ h_{1,1} = f(W_1\alpha + b_1) \end{cases}$$

where $h_{g+1,1}$ represents output of the $(g+1)^{th}$ layer of the neural network model, $W_1$, $b_1$, $W_{g+1}$, and $b_{g+1}$ represent parameters of the neural network model, $f(\bullet)$ represents a nonlinear activation function, and $\alpha$ represents the first body relationship feature and the second body relationship feature, and M times of recursion is represented as the following formula:

$$\begin{cases} h_{N+1,q+1} = f(W_{N+1}h_{N,1} + W_b \mid P_q + b_{N+1}) \\ p_q = f(W_{cls}h_{N+1,q} + b_{cls}), q = 1, 2, \ldots, M \end{cases}$$

where $P_q$ represents the output of the $q^{th}$ recursion of the $(N+1)^{th}$ layer of the neural network model, and when q is M, $P_q$ represents the body relationship between the two persons, $h_{N+1,q+1}$ represents an intermediate variable of the $(q+1)^{th}$ recursion of the $(N+1)^{th}$ layer of the neural network model, and $W_{N+1}$, $W_b$, $b_{N+1}$, $W_{cls}$, and $b_{cls}$ represent parameters of the neural network model, where all parameters in the neural network model may be obtained by means of training.

According to a fourth aspect, an embodiments of the present application discloses an apparatus for generating a neural network model for body relationship estimation, where the apparatus includes a first obtaining unit, configured to obtain at least one training picture, a calculation unit, configured to calculate a first body relationship feature of two persons according to at least one of first location information of a body part of each person of the two persons in each picture of the at least one training picture obtained by the first obtaining unit or second location information of body parts of the two persons, where the first location information is obtained by performing single-person gesture estimation on each person, and the second location information is obtained by performing two-person joint gesture estimation on the two persons when the first location information indicates that the body parts of the two persons overlap, and a determining unit, configured to determine the neural network model according to the first body relationship feature calculated by the calculation unit and a preset body relationship between the two persons.

In an embodiment, the apparatus may further include a second obtaining unit, configured to obtain a second body relationship feature of the two persons, where the second body relationship feature includes at least one of a first confidence value of the first location information, first direction information of the body part of each person, a second confidence value of the second location information, or second direction information of the body part of each person, where the first confidence value and the first direction information are obtained by performing single-person gesture estimation on each person, the second confidence value and the second direction information are obtained by performing two-person joint gesture estimation on the two persons when the first location information indicates that the body parts of the two persons overlap, the first confidence value of the first (or second) location information indicates confidence that a body part at a location corresponding to the first (or second) location information is at the location corresponding to the first (or second) location information, and the first (or second) direction information of the body part of each person is information about a direction corresponding to a gesture that may be posed by the body part of each person, and the determining unit is configured to determine the neural network model according to the first body relationship feature calculated by the calculation unit, the second body relationship feature obtained by the second obtaining unit, and the preset body relationship between the two persons.

In the embodiments of the present application, location information of a body part is first obtained according to results of single-person gesture estimation and two-person joint gesture estimation, a body relationship feature of two persons is further calculated, and then a body relationship between the two persons is determined according to the body relationship feature, which may improve accuracy of body relationship estimation.

BRIEF DESCRIPTION OF DRAWINGS

To describe the technical solutions in the embodiments of the present application more clearly, the following briefly describes the accompanying drawings required for describing the embodiments. The accompanying drawings in the following description show some embodiments of the present application, and a person of ordinary skill in the art may still derive other drawings from these accompanying drawings without creative efforts.

DESCRIPTION OF EMBODIMENTS

The following clearly describes the technical solutions in embodiments of the present application with reference to the accompanying drawings in the embodiments of the present application. The described embodiments are some but not all of the embodiments of the present application. All other embodiments obtained by a person of ordinary skill in the art based on the embodiments of the present application without creative efforts shall fall within the protection scope of the present application.

The embodiments of the present application disclose a body relationship estimation method and apparatus so as to improve accuracy of body relationship estimation. The following separately provides detailed descriptions.

Figure 1:
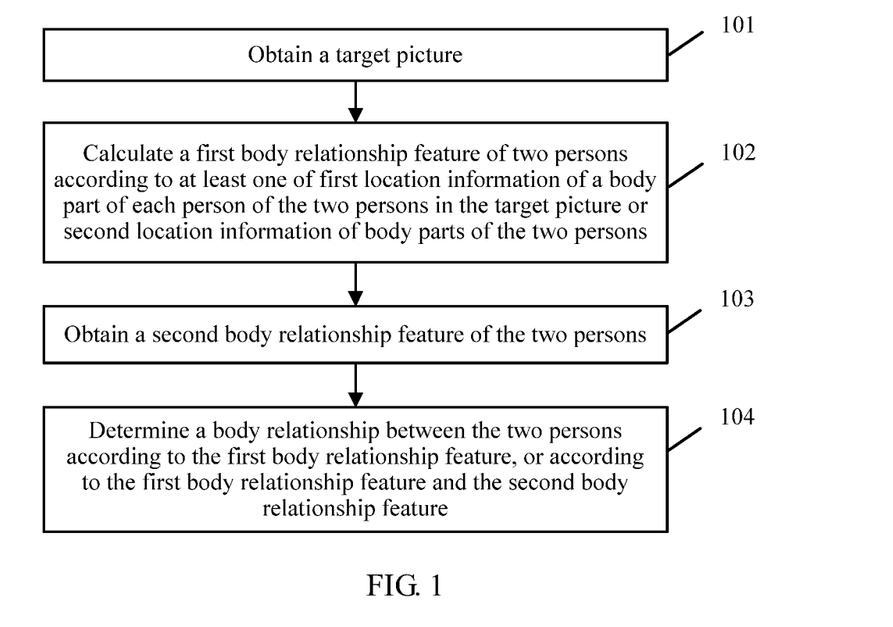
FIG. 1 is a flowchart of a body relationship estimation method according to an embodiment of the present application.

Referring to FIG. 1, a flowchart of a body relationship estimation method according to an embodiment of the present application is shown. The body relationship estimation method is applicable to various devices that can display a picture and can run a deep neural network algorithm, for example, a computer. As shown in FIG. 1, the body relationship estimation method may include the following steps.

101. Obtain a target picture.

In this embodiment, when a body relationship between two persons in a picture needs to be determined by using a device such as a computer, a user may input a body relationship determining instruction to the device. Then, the device may automatically obtain the target picture from a network or from the device, or the user may operate the device to obtain the target picture from a network or from the device, which is not limited in this embodiment. When the picture includes only one person, a body relationship between the person and another person cannot be determined by using the picture. Therefore, the body relationship estimation method is applicable to a picture that includes at least two persons.

102. Calculate a first body relationship feature of two persons according to at least one of first location information of a body part of each person of the two persons in the target picture or second location information of body parts of the two persons.

In this embodiment, the first body relationship feature may include at least one of a matching degree between the body part that is of the person and indicated by the first location information and the body part that is of either person of the two persons and indicated by the second location information, an overlap proportion between the two persons indicated by the first location information, or a relative distance from each body part that is of each person of the two persons and indicated by the first location information to a central location of the two persons. More elements included in the first body relationship feature indicate higher accuracy of body relationship estimation. A formula for calculating each element included in the first body relationship feature is the same as that in the summary part, and details are not described herein again. In single-person gesture estimation, each person in the picture is independently estimated according to a histogram of oriented gradient (HOG) feature and a support vector machine (SVM) classifier. In two-person joint gesture estimation, when the two persons in the picture overlap, the two persons are jointly estimated according to the HOG feature and the SVM classifier.

103. Obtain a second body relationship feature of the two persons.

In this embodiment, a second body relationship feature may include at least one of a first confidence value of the first location information, first direction information of the body part of each person, a second confidence value of the second location information, or second direction information of the body part of each person. The first confidence value of the first (or second) location information indicates confidence that a body part at a location corresponding to the first (or second) location information is at the location corresponding to the first (or second) location information, where a larger confidence value indicates higher confidence. The first (or second) direction information of the body part of each person is information about a direction corresponding to each gesture that may be posed by the body part of each person, for example, a direction in which a hand may be placed when a person stands.

104. Determine a body relationship between the two persons according to the first body relationship feature, or according to the first body relationship feature and the second body relationship feature.

In this embodiment, the body relationship may include at least one of a body interaction relationship between the two persons, a relative distance between the two persons, a relative inclined body direction of the two persons, or a relative body orientation of the two persons. The body relationship may be determined according to the first body relationship feature, or may be determined according to both the first body relationship feature and the second body relationship feature. However, accuracy of determining according to both the first body relationship feature and the second body relationship feature is higher than accuracy of determining according to the first body relationship feature.

In the body relationship estimation method described in FIG. 1, location information of a body part is first obtained according to results of single-person gesture estimation and two-person joint gesture estimation, a body relationship feature of two persons is further calculated, and then a body relationship between the two persons is determined according to the body relationship feature, which may improve accuracy of body relationship estimation.

Figure 2:
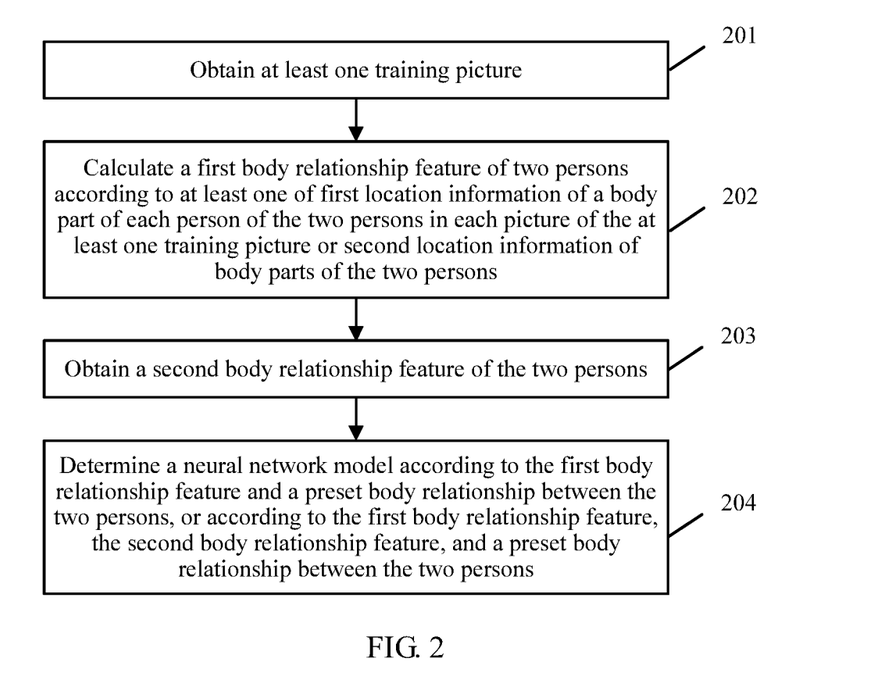
FIG. 2 is a flowchart of a method for generating a neural network model for body relationship estimation according to an embodiment of the present application.

Referring to FIG. 2, a flowchart of a method for generating a neural network model for body relationship estimation according to an embodiment of the present application is shown. The method for generating a neural network model for body relationship estimation is applicable to various devices that can display a picture and can run a deep neural network algorithm, for example, a computer. As shown in FIG. 2, the method for generating a neural network model for body relationship estimation may include the following steps.

201. Obtain at least one training picture.

In this embodiment, to obtain a neural network model needed in the foregoing embodiment, the at least one training picture may be first obtained for training.

202. Calculate a first body relationship feature of two persons according to at least one of first location information of a body part of each person of the two persons in each picture of the at least one training picture or second location information of body parts of the two persons.

In this embodiment, the first location information is obtained by performing single-person gesture estimation on each person in the training picture, and the second location information is obtained by performing two-person joint gesture estimation on the two persons overlapping in the target picture, when the first location information indicates that the body parts of the two persons in the target picture overlap. The first body relationship feature may include at least one of a matching degree between the body part that is of the person and indicated by the first location information and the body part that is of either person of the two persons and indicated by the second location information, an overlap proportion between the two persons indicated by the first location information, or a relative distance from each body part that is of each person of the two persons and indicated by the first location information to a central location of the two persons. In the single-person gesture estimation, each person in the picture is independently estimated according to a HOG feature and an SVM classifier. In the two-person joint gesture estimation, when the two persons in the picture overlap, the two persons are jointly estimated according to the HOG feature and the SVM classifier.

203. Obtain a second body relationship feature of the two persons.

In this embodiment, a second body relationship feature may include at least one of a first confidence value of the first location information, first direction information of the body part of each person, a second confidence value of the second location information, or second direction information of the body part of each person. The first confidence value of the first (or second) location information indicates confidence that a body part at a location corresponding to the first (or second) location information is at the location corresponding to the first (or second) location information, where a larger confidence value indicates higher confidence. The first (or second) direction information of the body part of each person is information about a direction corresponding to each gesture that may be posed by the body part of each person, for example, a direction in which a hand may be placed when a person stands.

204. Determine a neural network model according to the first body relationship feature and a preset body relationship between the two persons, or according to the first body relationship feature, the second body relationship feature, and a preset body relationship between the two persons.

In this embodiment, the neural network model may be determined according to the first body relationship feature and the preset body relationship between the two persons, or may be determined jointly according to the first body relationship feature, the second body relationship feature, and the preset body relationship between the two persons. However, accuracy of determining jointly according to the first body relationship feature, the second body relationship feature, and the preset body relationship between the two persons is higher than accuracy of determining according to the first body relationship feature and the preset body relationship between the two persons.

In the method that is for generating a neural network model for body relationship estimation and described in FIG. 2, location information of a body part is first obtained according to results of single-person gesture estimation and two-person joint gesture estimation, a body relationship feature of two persons in a training picture is further calculated, and then a neural network model is determined according to the body relationship feature, which may improve accuracy of a neural network model.

Figure 3:
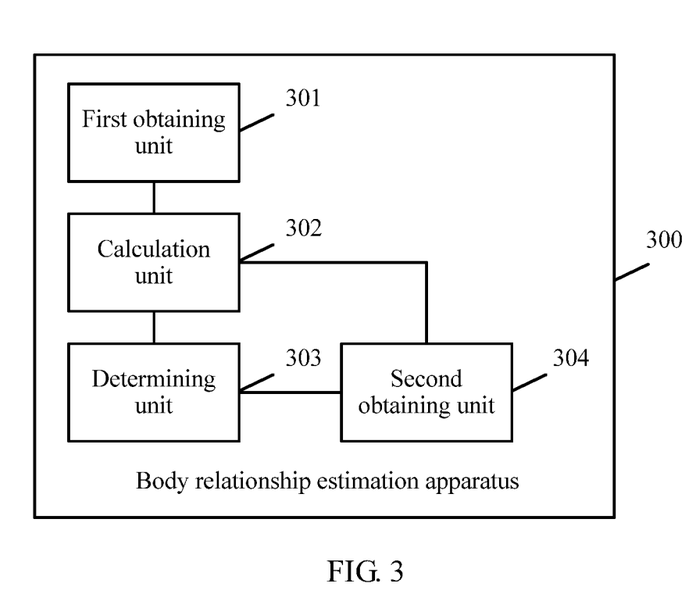
FIG. 3 is a structural diagram of a body relationship estimation apparatus according to an embodiment of the present application.

Referring to FIG. 3, a flowchart of a body relationship estimation apparatus according to an embodiment of the present application is shown. The body relationship estimation apparatus 300 is a device that can display a picture and can run a deep neural network algorithm, for example, a computer. As shown in FIG. 3, the body relationship estimation apparatus 300 may include a first obtaining unit 301, configured to obtain a target picture, a calculation unit 302 configured to calculate a first body relationship feature of two persons according to at least one of first location information of a body part of each person of the two persons in the target picture obtained by the first obtaining unit 301 or second location information of body parts of the two persons, where the first location information is obtained by performing single-person gesture estimation on each person, and the second location information is obtained by performing two-person joint gesture estimation on the two persons when the first location information indicates that the body parts of the two persons overlap, and a determining unit 303, configured to determine a body relationship between the two persons according to the first body relationship feature calculated by the calculation unit 302.

In a possible implementation manner, the first body relationship feature may include at least one of a matching degree between the body part indicated by the first location information and the body parts indicated by the second location information, an overlap proportion between the two persons, or a relative distance from each body part of each person of the two persons to a central location of the two persons.

In a possible implementation manner, the first location information may include a first area used to indicate a location of the body part of each person, and the overlap proportion between the two persons includes an overlap proportion between the $i^{th}$ body parts of the two persons, where i is an integer greater than or equal to 1.

When the first body relationship feature includes the overlap proportion between the two persons, a manner in which the calculation unit 302 calculates the overlap proportion between the two persons is calculating the overlap proportion between the $i^{th}$ body parts of the two persons by using the following formula:

$$\Psi_{ov} = \frac{\bigcap (box_i^1, box_i^2)}{\bigcup (box_i^1, box_i^2)}$$

here $\Psi_{ov}$ represents the overlap proportion between the $i^{th}$ body parts of the two persons, $box_i^1$ represents a first area of a location of the $i^{th}$ body part of the first person of the two persons, and $box_i^2$ represents a first area of a location of the $i^{th}$ body part of the second person of the two persons.

In a possible implementation manner, the relative distance from each body part of each person of the two persons to the central location of the two persons includes a relative distance from the $j^{th}$ body part of each person to the central location of the two persons, and the first location information may include coordinates of the body part of each person in the target picture, where j is an integer greater than or equal to 1.

When the first body relationship feature includes the relative distance from each body part of each person of the two persons to the central location of the two persons, a manner in which the calculation unit 302 calculates the relative distance from each body part of each person of the two persons to the central location of the two persons is calculating the relative distance from the $j^{th}$ body part of each person to the central location of the two persons by using the following formula:

$$\Psi_L = \left\{ [x_j^k, y_j^k] - \frac{1}{2n}\sum_{k=1}^{2}\sum_{j=1}^{n}[x_j^k, y_j^k] \right\} / n_{scale}$$

where $\Psi_L$ represents the relative distance from the $j^{th}$ body part of each person to the central location of the two persons, $[x_j^k, y_j^k]$ represents coordinates of the $j^{th}$ body part of the $k^{th}$ person of the two persons in the target picture, n represents a total quantity of body parts included in each person, $n_{scale}$ is a sum of distances from the central location to all body parts of the two persons, $$\frac{1}{2n}\sum_{k=1}^{2}\sum_{j=1}^{n}[x_j^k, y_j^k]$$

represents coordinates of the central location, n is an integer greater than 1, and k is 1 or 2.

In a possible implementation manner, the first location information may include the first area used to indicate the location of the body part of each person, the second location information may include a second area used to indicate the location of the body part of each person, and the matching degree between the body part indicated by the first location information and the body parts indicated by the second location information includes a matching degree between a first area used to indicate a location of the $t^{th}$ body part of each person and a second area used to indicate the location of the $t^{th}$ body part of each person, where t is an integer greater than or equal to 1.

When the first body relationship feature includes the matching degree between the body part indicated by the first location information and the body parts indicated by the second location information, a manner in which the calculation unit 302 calculates the matching degree between the body part indicated by the first location information and the body parts indicated by the second location information is calculating, by using the following formula, the matching degree between the first area used to indicate the location of the $t^{th}$ body part of each person and the second area used to indicate the location of the $t^{th}$ body part of each person:

$$\Psi_m = \frac{\bigcap (A_t^1, A_t^2)}{\bigcup (A_t^1, A_t^2)}$$

where $\Psi_m$ represents the matching degree between the first area used to indicate the location of the $t^{th}$ body part of each person and the second area used to indicate the location of the $t^{th}$ body part of each person, $A_t^1$ represents the first area used to indicate the location of the $t^{th}$ body part of each person, and $A_t^2$ represents the second area used to indicate the location of the $t^{th}$ body part of each person.

In a possible implementation manner, the body relationship may include at least one of a body interaction relationship between the two persons, a relative distance between the two persons, a relative inclined body direction of the two persons, or a relative body orientation of the two persons, where the body interaction relationship may include at least one of arm in arm, a handshake, or a hug.

In a possible implementation manner, the body relationship estimation apparatus 300 may further include a second obtaining unit 304 configured to obtain a second body relationship feature of the two persons, where the second body relationship feature may include at least one of a first confidence value of the first location information, first direction information of the body part of each person, a second confidence value of the second location information, or second direction information of the body part of each person.

The first confidence value and the first direction information are obtained by performing single-person gesture estimation on each person, and the second confidence value and the second direction information are obtained by performing two-person joint gesture estimation on the two persons when the first location information indicates that the body parts of the two persons overlap.

The determining unit 303 is configured to determine the body relationship between the two persons according to the first body relationship feature calculated by the calculation unit 302 and the second body relationship feature obtained by the second obtaining unit 304.

In a possible implementation manner, a manner in which the determining unit 303 determines the body relationship between the two persons according to the first body relationship feature and the second body relationship feature is using the first body relationship feature and the second body relationship feature as input of the $(N+1)^{th}$ layer of a neural network model, and using output of the $(N+1)^{th}$ layer of the neural network model as the body relationship between the two persons, where the $(N+1)^{th}$ layer includes M times of recursion, the output of the $(N+1)^{th}$ layer includes output of the $M^{th}$ recursion, N is an integer greater than or equal to 1, and M is an integer greater than 1.

In a possible implementation manner, output of the first N layers of the neural network model may be represented as the following formula:

$$\begin{cases} h_{g+1,1} = f(W_{g+1}h_{g,1} + b_{g+1}), g = 1, \ldots, N-1 \\ h_{1,1} = f(W_1\alpha + b_1) \end{cases}$$

where $h_{g+1,1}$ represents output of the $(g+1)^{th}$ layer of the neural network model, $W_1$, $b_1$, $W_{g+1}$, and $b_{g+1}$ represent parameters of the neural network model, $f(\bullet)$ represents a nonlinear activation function, and $\alpha$ represents the first body relationship feature and the second body relationship feature. The M times of recursion may be represented as the following formula:

$$\begin{cases} h_{N+1,q+1} = f(W_{N+1}h_{N,1} + W_b \mid P_q + b_{N+1}) \\ p_q = f(W_{cls}h_{N+1,q} + b_{cls}), q = 1, 2, \ldots, M \end{cases}$$

where $P_q$ represents output of the $q^{th}$ recursion of the $(N+1)^{th}$ layer of the neural network model, and when q is M, $P_q$ represents the body relationship between the two persons; $h_{N+1,q+1}$ represents an intermediate variable of the $(q+1)^{th}$ recursion of the $(N+1)^{th}$ layer of the neural network model; and $W_{N+1}$, $W_b$, $b_{N+1}$, $W_{cls}$, and $b_{cls}$ represent parameters of the neural network model.

In the body relationship estimation apparatus described in FIG. 3, location information of a body part is first obtained according to results of single-person gesture estimation and two-person joint gesture estimation, a body relationship feature of two persons is further calculated, and then a body relationship between the two persons is determined according to the body relationship feature, which may improve accuracy of body relationship estimation.

Figure 4:
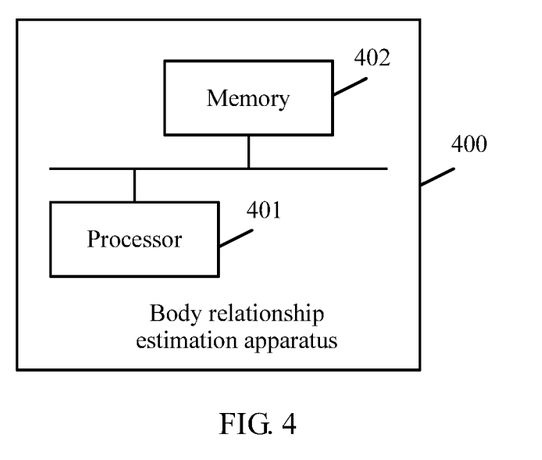
FIG. 4 is a structural diagram of another body relationship estimation apparatus according to an embodiment of the present application.

Referring to FIG. 4, a structural diagram of another body relationship estimation apparatus according to an embodiment of the present application is shown. The body relationship estimation apparatus 400 is a device that can display a picture and can run a deep neural network algorithm, for example, a computer. As shown in FIG. 4, the body relationship estimation apparatus 400 may include a processor 401 and a memory 402. The processor 401 may be connected to the memory 402 by using a bus or in another manner. A bus connection manner is used as an example in this embodiment, where the memory 402 stores a group of program code, and the processor 401 is configured to invoke the program code stored in the memory 402 to obtain a target picture, calculate a first body relationship feature of two persons according to at least one of first location information of a body part of each person of the two persons in the target picture or second location information of body parts of the two persons, where the first location information is obtained by performing single-person gesture estimation on each person, and the second location information is obtained by performing two-person joint gesture estimation on the two persons when the first location information indicates that the body parts of the two persons overlap, and determine a body relationship between the two persons according to the first body relationship feature.

In a possible implementation manner, the first body relationship feature includes at least one of a matching degree between the body part indicated by the first location information and the body parts indicated by the second location information, an overlap proportion between the two persons, or a relative distance from each body part of each person to a central location of the two persons.

In a possible implementation manner, the first location information may include a first area used to indicate a location of the body part of each person, and the overlap proportion between the two persons includes an overlap proportion between the $i^{th}$ body parts of the two persons, where i is an integer greater than or equal to 1.

When the first body relationship feature includes the overlap proportion between the two persons, a manner for calculating the overlap proportion between the two persons according to at least one of the first location information of the body part of each person of the two persons in the target picture or the second location information of the body parts of the two persons is calculating the overlap proportion between the $i^{th}$ body parts of the two persons by using the following formula:

$$\Psi_{ov} = \frac{\bigcap (box_i^1, box_i^2)}{\bigcup (box_i^1, box_i^2)}$$

where $\Psi_{ov}$ represents the overlap proportion between the $i^{th}$ body parts of the two persons, $box_i^1$ represents a first area of a location of the $i^{th}$ body part of the first person of the two persons, and $box_i^2$ represents a first area of a location of the $i^{th}$ body part of the second person of the two persons.

In a possible implementation manner, the relative distance from each body part of each person to the central location of the two persons includes a relative distance from the $j^{th}$ body part of each person to the central location of the two persons, and the first location information includes coordinates of the body part of each person in the target picture, where j is an integer greater than or equal to 1.

When the first body relationship feature includes the relative distance from each body part of each person of the two persons to the central location of the two persons, a manner for calculating the relative distance from each body part of each person of the two persons to the central location of the two persons according to at least one of the first location information of the body part of each person of the two persons in the target picture or the second location information of the body parts of the two persons is calculating the relative distance from the $j^{th}$ body part of each person to the central location of the two persons by using the following formula:

$$\Psi_L = \left\{ [x_j^k, y_j^k] - \frac{1}{2n} \sum_{k=1}^{2} \sum_{j=1}^{n} [x_j^k, y_j^k] \right\} / n_{scale}$$

where $\Psi_L$ represents the relative distance from the $j^{th}$ body part of each person to the central location of the two persons, $[x_j^k, y_j^k]$ represents coordinates of the $j^{th}$ body part of the $k^{th}$ person of the two persons in the target picture, n represents a total quantity of body parts included in each person, $n_{scale}$ is a sum of distances from the central location to all body parts of the two persons, $$\frac{1}{2n} \sum_{k=1}^{2} \sum_{j=1}^{n} [x_j^k, y_j^k]$$

represents coordinates of the central location, n is an integer greater than 1, and k is 1 or 2.

In a possible implementation manner, the first location information includes the first area used to indicate the location of the body part of each person, the second location information includes a second area used to indicate the location of the body part of each person, and the matching degree between the body part indicated by the first location information and the body parts indicated by the second location information includes a matching degree between a first area used to indicate a location of the $t^{th}$ body part of each person and a second area used to indicate the location of the $t^{th}$ body part of each person, where t is an integer greater than or equal to 1.

When the first body relationship feature includes the matching degree between the body part indicated by the first location information and the body parts represented by the second location information, a manner for calculating, according to at least one of the first location information of the body part of each person of the two persons in the target picture or the second location information of the body parts of the two persons, the matching degree between the body part indicated by the first location information and the body parts indicated by the second location information is calculating, by using the following formula, the matching degree between the first area used to indicate the location of the $t^{th}$ body part of each person and the second area used to indicate the location of the $t^{th}$ body part of each person:

$$\Psi_m = \frac{\bigcap (A_t^1, A_t^2)}{\bigcup (A_t^1, A_t^2)}$$

where $\Psi_m$ represents the matching degree between the first area used to indicate the location of the $t^{th}$ body part of each person and the second area used to indicate the location of the $t^{th}$ body part of each person, $A_t^1$ represents the first area used to indicate the location of the $t^{th}$ body part of each person, and $A_t^2$ represents the second area used to indicate the location of the $t^{th}$ body part of each person.

In a possible implementation manner, the body relationship includes at least one of a body interaction relationship between the two persons, a relative distance between the two persons, a relative inclined body direction of the two persons, or a relative body orientation of the two persons, where the body interaction relationship includes at least one of arm in arm, a handshake, or a hug.

In a possible implementation manner, the processor 401 is further configured to invoke the program code stored in the memory 402 to obtain a second body relationship feature of the two persons, where the second body relationship feature includes at least one of a first confidence value of the first location information, first direction information of the body part of each person, a second confidence value of the second location information, or second direction information of the body part of each person.

The first confidence value and the first direction information are obtained by performing single-person gesture estimation on each person, and the second confidence value and the second direction information are obtained by performing two-person joint gesture estimation on the two persons when the first location information indicates that the body parts of the two persons overlap.

A manner for determining the body relationship between the two persons according to the first body relationship feature is determining the body relationship between the two persons according to the first body relationship feature and the second body relationship feature.

In a possible implementation manner, a manner for determining the body relationship between the two persons according to the first body relationship feature and the second body relationship feature is using the first body relationship feature and the second body relationship feature as input of the $(N+1)^{th}$ layer of a neural network model, and using output of the $(N+1)^{th}$ layer of the neural network model as the body relationship between the two persons, where the $(N+1)^{th}$ layer includes M times of recursion, the output of the $(N+1)^{th}$ layer includes output of the $M^{th}$ recursion, N is an integer greater than or equal to 1, and M is an integer greater than 1.

In a possible implementation manner, output of the first N layers of the neural network model are represented as the following formula:

$$\begin{cases} h_{g+1,1} = f(W_{g+1}h_{g,1} + b_{g+1}), g = 1, \ldots, N-1 \\ h_{1,1} = f(W_1\alpha + b_1) \end{cases}$$

where $h_{g+1,1}$ represents output of the $(g+1)^{th}$ layer of the neural network model, $W_1$, $b_1$, $W_{g+1}$, and $b_{g+1}$ represent parameters of the neural network model, $f(\bullet)$ represents a nonlinear activation function, and $\alpha$ represents the first body relationship feature and the second body relationship feature. The M times of recursion is represented as the following formula:

$$\begin{cases} h_{N+1,q+1} = f(W_{N+1}h_{N,1} + W_b | P_q + b_{N+1}) \\ p_q = f(W_{cls}h_{N+1,q} + b_{cls}), q = 1, 2, \ldots, M \end{cases}$$

where $P_q$ represents output of the $q^{th}$ recursion of the $(N+1)^{th}$ layer of the neural network model, and when q is M, $P_q$ represents the body relationship between the two persons; $h_{N+1,q+1}$ represents an intermediate variable of the $(q+1)^{th}$ recursion of the $(N+1)^{th}$ layer of the neural network model; and $W_{N+1}$, $W_b$, $b_{N+1}$, $W_{cls}$, and $b_{cls}$ represent parameters of the neural network model.

In the body relationship estimation apparatus described in FIG. 4, location information of a body part is first obtained according to results of single-person gesture estimation and two-person joint gesture estimation, a body relationship feature of two persons is further calculated, and then a body relationship between the two persons is determined according to the body relationship feature, which may improve accuracy of body relationship estimation.

Figure 5:
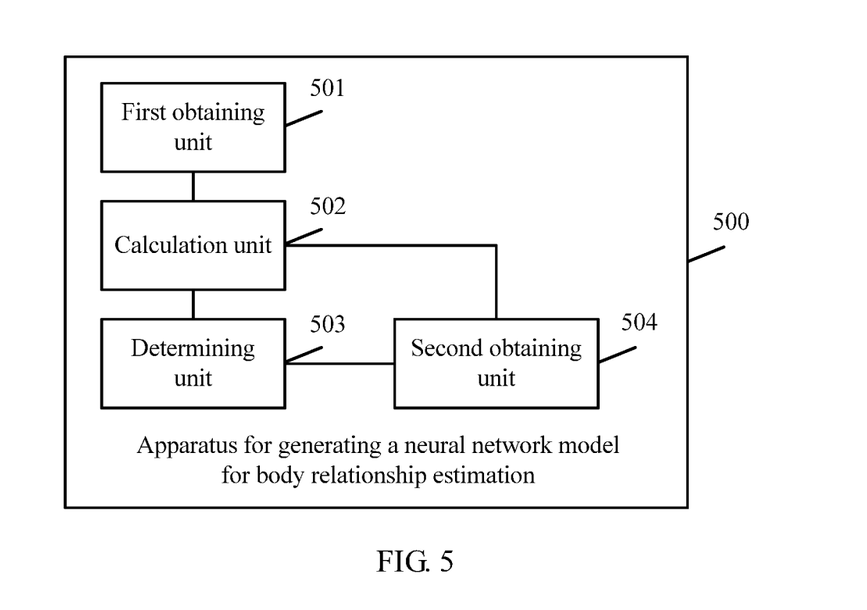
FIG. 5 is a structural diagram of an apparatus for generating a neural network model for body relationship estimation according to an embodiment of the present application.

Referring to FIG. 5, a structural diagram of an apparatus for generating a neural network model for body relationship estimation according to an embodiment of the present application is shown. The generation apparatus 500 is a device that can display a picture and can run a deep neural network algorithm, for example, a computer. As shown in FIG. 5, the generation apparatus 500 may include a first obtaining unit 501 configured to obtain at least one training picture, a calculation unit 502 configured to calculate a first body relationship feature of two persons according to at least one of first location information of a body part of each person of the two persons in each picture of the at least one target picture obtained by the first obtaining unit 501 or second location information of body parts of the two persons, where the first location information is obtained by performing single-person gesture estimation on each person, and the second location information is obtained by performing two-person joint gesture estimation on the two persons when the first location information indicates that the body parts of the two persons overlap, and a determining unit 503 configured to determine the neural network model according to the first body relationship feature calculated by the calculation unit 502 and a preset body relationship between the two persons.

In a possible implementation manner, the generation apparatus 500 may further include a second obtaining unit 504 configured to obtain a second body relationship feature of the two persons, where the second body relationship feature includes at least one of a first confidence value of the first location information, first direction information of the body part of each person, a second confidence value of the second location information, or second direction information of the body part of each person.

The first confidence value and the first direction information are obtained by performing single-person gesture estimation on each person, and the second confidence value and the second direction information are obtained by performing two-person joint gesture estimation on the two persons when the first location information indicates that the body parts of the two persons overlap.

The determining unit 503 is configured to determine the neural network model according to the first body relationship feature calculated by the calculation unit 502, the second body relationship feature obtained by the second obtaining unit 504, and the preset body relationship between the two persons.

In the apparatus that is for generating a neural network model for body relationship estimation and described in FIG. 5, location information of a body part is first obtained according to results of single-person gesture estimation and two-person joint gesture estimation, a body relationship feature of two persons in a training picture is further calculated, and then the neural network model is determined according to the body relationship feature, which may improve accuracy of a neural network model.

Figure 6:
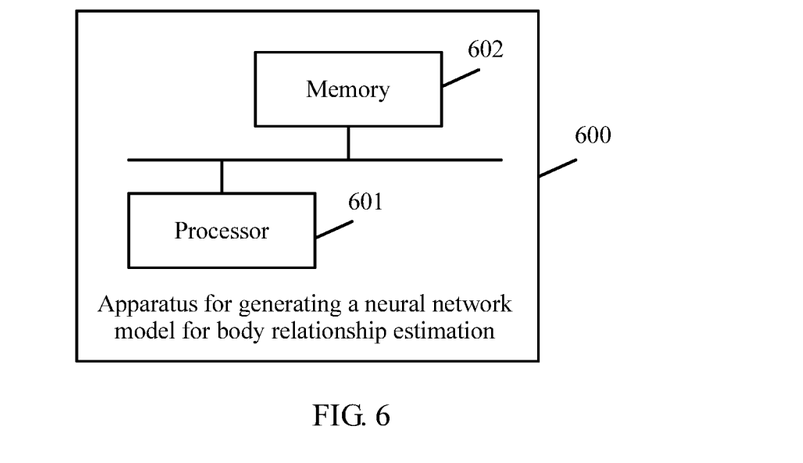
FIG. 6 is a structural diagram of another apparatus for generating a neural network model for body relationship estimation according to an embodiment of the present application.

Referring to FIG. 6, a structural diagram of another apparatus for generating a neural network model for body relationship estimation according to an embodiment of the present application is shown. The generation apparatus 600 is a device that can display a picture and can run a deep neural network algorithm, for example, a computer. As shown in FIG. 6, the generation apparatus 600 may include a processor 601 and a memory 602. The processor 601 may be connected to the memory 602 by using a bus or in another manner. A bus connection manner is used as an example in this embodiment, where the memory 602 stores a group of program code, and the processor 601 is configured to invoke the program code stored in the memory 602 to obtain at least one training picture, calculate a first body relationship feature of two persons according to at least one of first location information of a body part of each person of the two persons in each picture of the at least one training picture or second location information of body parts of the two persons, where the first location information is obtained by performing single-person gesture estimation on each person, and the second location information is obtained by performing two-person joint gesture estimation on the two persons when the first location information indicates that the body parts of the two persons overlap, and determine the neural network model according to the first body relationship feature and a preset body relationship between the two persons.

In a possible implementation manner, the processor 601 is further configured to invoke the program code stored in the memory 602 to obtain a second body relationship feature of the two persons, where the second body relationship feature includes at least one of a first confidence value of the first location information, first direction information of the body part of each person, a second confidence value of the second location information, or second direction information of the body part of each person.

The first confidence value and the first direction information are obtained by performing single-person gesture estimation on each person, and the second confidence value and the second direction information are obtained by performing two-person joint gesture estimation on the two persons when the first location information indicates that the body parts of the two persons overlap.

The determining the neural network model according to the first body relationship feature and a preset body relationship between the two persons includes determining the neural network model according to the first body relationship feature, the second body relationship feature, and the preset body relationship between the two persons.

In the apparatus that is for generating a neural network model for body relationship estimation and described in FIG. 6, location information of a body part is first obtained according to results of single-person gesture estimation and two-person joint gesture estimation, a body relationship feature of two persons in a training picture is further calculated, and then the neural network model is determined according to the body relationship feature, which may improve accuracy of a neural network model.

A person of ordinary skill in the art may understand that all or some of the steps of the methods in the embodiments may be implemented by a program instructing relevant hardware. The program may be stored in a computer-readable storage medium. The storage medium may include a flash memory, a read-only memory (ROM), a random access memory (RAM), a magnetic disk, and an optical disc.

The foregoing gives detailed descriptions on the body relationship estimation method and apparatus that are provided in the embodiments of the present application. In this specification, specific examples are used to describe the principle and implementation manners of the present application, and the description of the embodiments is only intended to help understand the method and core idea of the present application. At a same time, a person of ordinary skill in the art may, based on the idea of the present application, make modifications with respect to the specific implementation manners and the application scope. Therefore, the content of this specification shall not be construed as a limitation to the present application.

What is claimed is:

1. A method for generating a neural network model for body relationship estimation, comprising:
   obtaining at least one training picture;
   calculating a first body relationship feature of two persons according to first location information of a body part of each person of the two persons in each picture of the at least one training picture and second location information of body parts of the two persons, the first location information being obtained by performing single-person gesture estimation on each person, and the second location information being obtained by performing two-person joint gesture estimation on the two persons when the first location information indicates that the body parts of the two persons overlap; and
   determining the neural network model according to the first body relationship feature and a preset body relationship between the two persons.

2. The method according to claim 1, further comprising obtaining a second body relationship feature of the two persons, the second body relationship feature comprising at least one of a first confidence value of the first location information, first direction information of the body part of each person, a second confidence value of the second location information, or second direction information of the body part of each person, the first confidence value and the first direction information being obtained by performing single-person gesture estimation on each person, the second confidence value and the second direction information being obtained by performing two-person joint gesture estimation on the two persons when the first location information indicates that the body parts of the two persons overlap, and determining the neural network model according to the first body relationship feature and the preset body relationship between the two persons comprises determining the neural network model according to the first body relationship feature, the second body relationship feature, and the preset body relationship between the two persons.

3. A body relationship estimation apparatus, comprising:
   a memory; and
   a processor coupled to the memory and configured to:
      obtain a target picture;
      calculate a first body relationship feature of two persons according to first location information of a body part of each person of the two persons in the target picture obtained by the processor and second location information of body parts of the two persons, the first location information being obtained by performing single-person gesture estimation on each person and the second location information is obtained by performing two-person joint gesture estimation on the two persons when the first location information indicates that the body parts of the two persons overlap; and
      determine a neural network model according to the first body relationship feature and a preset body relationship between the two persons.

4. The apparatus according to claim 3, wherein the first body relationship feature comprises at least one of a matching degree between the body part indicated by the first location information and the body parts indicated by the second location information, an overlap proportion between the two persons, or a relative distance from each body part of each person to a central location of the two persons.

5. The apparatus according to claim 4, wherein the first location information comprises a first area used to indicate a location of the body part of each person and the overlap proportion between the two persons comprises an overlap proportion between the $i^{th}$ body parts of the two persons, 'i' being an integer greater than or equal to 1, the processor being configured to calculate the overlap proportion between the $i^{th}$ body parts of the two persons by using the following formula:

$$\Psi_{ov} = \frac{\bigcap (box_i^1, box_i^2)}{\bigcup (box_i^1, box_i^2)}$$

$\Psi_{ov}$ representing the overlap proportion between the $i^{th}$ parts of the two persons, $box_i^1$ representing a first area of a location of the $i^{th}$ body part of the first person of the two persons, and $box_i^2$ representing a first area of a location of the $i^{th}$ body part of the second person of the two persons.

6. The apparatus according to claim 4, wherein the relative distance from each body part of each person to the central location of the two persons comprises a relative distance from the $j^{th}$ body part of each person to the central location of the two persons and the first location information comprises coordinates of the body part of each person in the target picture, 'j' being an integer greater than or equal to 1, the processor being configured to calculate the relative distance from the $j^{th}$ body part of each person to the central location of the two persons by using the following formula:

$$\Psi_L = \left\{ [x_j^k, y_j^k] - \frac{1}{2n}\sum_{k=1}^{2}\sum_{j=1}^{n}[x_j^k, y_j^k] \right\} / n_{scale}$$

$\Psi_L$ representing the relative distance from the $j^{th}$ body part of each person to the central location of the two persons, $[x_j^k, y_j^k]$ representing coordinates of the $j^{th}$ body part of the $k^{th}$ person of the two persons in the target picture, 'n' representing a total quantity of body parts comprised in each person, $n_{scale}$ being a sum of distances from the central location to all body parts of the two persons, $$\frac{1}{2n}\sum_{k=1}^{2}\sum_{j=1}^{n}[x_j^k, y_j^k]$$

representing coordinates of the central location, 'n' being an integer greater than 1, and 'k' being 1 or 2.

7. The apparatus according to claim 4, wherein the first location information comprises the first area used to indicate the location of the body part of each person, the second location information comprises a second area used to indicate the location of the body part of each person, and the matching degree between the body part indicated by the first location information and the body parts indicated by the second location information comprise a matching degree between a first area used to indicate a location of the $t^{th}$ body part of each person and a second area used to indicate the location of the $t^{th}$ body part of each person, 't' being an integer greater than or equal to 1, the processor being configured to calculate, using the following formula, the matching degree between the first area used to indicate the location of the $t^{th}$ body part of each person and the second area used to indicate the location of the $t^{th}$ body part of each person:

$$\Psi_m = \frac{\bigcap(A_t^1, A_t^2)}{\bigcup(A_t^1, A_t^2)}$$

$\Psi_m$ representing the matching degree between the first area used to indicate the location of the $t^{th}$ body part of each person and the second area used to indicate the location of the $t^{th}$ body part of each person, $A_t^1$ representing the first area used to indicate the location of the $t^{th}$ body part of each person, and $A_t^2$ representing the second area used to indicate the location of the $t^{th}$ body part of each person.

8. The apparatus according to claim 3, wherein the body relationship comprises at least one of a body interaction relationship between the two persons, a relative distance between the two persons, a relative inclined body direction of the two persons, or a relative body orientation of the two persons, and the body interaction relationship comprising at least one of arm in arm, a handshake, or a hug.

9. The apparatus according to claim 3, wherein the processor is further configured to obtain a second body relationship feature of the two persons, the second body relationship feature comprising at least one of a first confidence value of the first location information, first direction information of the body part of each person, a second confidence value of the second location information, or second direction information of the body part of each person, the first confidence value and the first direction information being obtained by performing single-person gesture estimation on each person and the second confidence value and the second direction information being obtained by performing two-person joint gesture estimation on the two persons when the first location information indicates that the body parts of the two persons overlap, and the processor being configured to determine the body relationship between the two persons according to the first body relationship feature calculated by the processor and the second body relationship feature obtained by the processor.

10. The apparatus according to claim 9, wherein the processor is configured to use the first body relationship feature and the second body relationship feature as input of the $(N+1)^{th}$ layer of a neural network model and use output of the $(N+1)^{th}$ layer of the neural network model as the body relationship between the two persons, and the $(N+1)^{th}$ layer comprises 'M' times of recursion, the output of the $(N+1)^{th}$ layer comprises output of the $M^{th}$ recursion, 'N' is an integer greater than or equal to 1, and 'M' is an integer greater than 1.

11. The apparatus according to claim 10, wherein output of the first 'N' layers of the neural network model are represented as the following formula:

$$\begin{cases} h_{g+1,1} = f(W_{g+1}h_{g,1} + b_{g+1}), g = 1, \ldots, N-1 \\ h_{1,1} = f(W_1\alpha + b_1) \end{cases}$$

$h_{g+1,1}$ representing output of the $(g+1)^{th}$ layer of the neural network model, $W_1$, $b_1$, $W_{g+1}$, $b_{g+1}$ representing parameters of the neural network model, $f(\cdot)$ representing a nonlinear activation function, $\alpha$ representing the first body relationship feature and the second body relationship feature, the 'M' times of recursion being represented as the following formula:

$$\begin{cases} h_{N+1,q+1} = f(W_{N+1}h_{N,1} + W_b \mid P_q + b_{N+1}) \\ p_q = f(W_{cls}h_{N+1,q} + b_{cls}), q = 1, 2, \ldots, M \end{cases}$$

$P_q$ representing output of the $q^{th}$ recursion of the $(N+1)^{th}$ layer of the neural network model, $P_q$ representing the body relationship between the two persons when 'q' is 'M', $h_{N+1,q+1}$ representing an intermediate variable of the $(q+1)^{th}$ recursion of the $(N+1)^{th}$ layer of the neural network model, and $W_{N+1}$, $W_b$, $b_{N+1}$, $W_{cls}$, and $b_{cls}$ and representing parameters of the neural network model.

* * * * *

UNITED STATES PATENT AND TRADEMARK OFFICE
CERTIFICATE OF CORRECTION

PATENT NO. : 10,115,009 B2
APPLICATION NO. : 15/289450
DATED : October 30, 2018
INVENTOR(S) : Xiao Chu et al.

Page 1 of 1

It is certified that error appears in the above-identified patent and that said Letters Patent is hereby corrected as shown below:

On the Title Page

1. Column 1, Item (30), Line 1: "201510845504" should read "201510845504.8"

2. Page (2), Item (56), OTHER PUBLICATIONS, Line 15: "Conferece" should read "Conference"

In the Claims

3. Column 22, Claim 5, Line 49: Formula "$\Psi_{ov} = \dfrac{\bigcap(box_i^1, box_i^2)}{\bigcup(box_i^1, box_i^2)}$" should read "$\Psi_{ov} = \dfrac{\cap(box_i^1, box_i^2)}{\cup(box_i^1, box_i^2)}$"

4. Column 22, Claim 5, Line 55: "i$^{th}$ parts" should read "i$^{th}$ body parts"

5. Column 23, Claim 7, Line 41: Formula "$\Psi_m = \dfrac{\bigcap(A_t^1, A_t^2)}{\bigcup(A_t^1, A_t^2)}$" should read "$\Psi_m = \dfrac{\cap(A_t^1, A_t^2)}{\cup(A_t^1, A_t^2)}$"

Signed and Sealed this
Eleventh Day of December, 2018

Andrei Iancu
*Director of the United States Patent and Trademark Office*